US012353156B2

(12) United States Patent
Ohya

(10) Patent No.: US 12,353,156 B2
(45) Date of Patent: Jul. 8, 2025

(54) SHEET CONVEYING DEVICE AND IMAGE FORMING APPARATUS INCORPORATING THE SAME

(71) Applicant: Ryohhei Ohya, Kanagawa (JP)

(72) Inventor: Ryohhei Ohya, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/607,727

(22) Filed: Mar. 18, 2024

(65) Prior Publication Data

US 2024/0319653 A1 Sep. 26, 2024

(30) Foreign Application Priority Data

Mar. 22, 2023 (JP) ................................. 2023-045270
Nov. 16, 2023 (JP) ................................. 2023-195473

(51) Int. Cl.
*G03G 15/00* (2006.01)
*B65H 43/04* (2006.01)
*B65H 43/08* (2006.01)

(52) U.S. Cl.
CPC ............. *G03G 15/70* (2013.01); *B65H 43/04* (2013.01); *B65H 43/08* (2013.01); *G03G 15/6573* (2013.01); *B65H 2404/69* (2013.01); *B65H 2553/41* (2013.01); *B65H 2701/1311* (2013.01); *B65H 2701/1313* (2013.01); *G03G 2215/00616* (2013.01)

(58) Field of Classification Search
CPC ............... G03G 15/70; G03G 15/6573; G03G 2215/00616; B65H 43/04; B65H 43/08; B65H 2404/69; B65H 2553/41; B65H 2701/1311; B65H 2701/1313
See application file for complete search history.

(56) References Cited

U.S. PATENT DOCUMENTS 4,394,088 A * 7/1983 Hanamoto ............ G03G 15/70 399/21
2019/0121263 A1* 4/2019 Tamura .................. G03G 15/70
2021/0214176 A1 7/2021 Fukushima et al.
2021/0221636 A1 7/2021 Wakabayashi et al.

FOREIGN PATENT DOCUMENTS

JP 2001-337562 A 12/2001
JP 2005-047697 A 2/2005
JP 2010-254456 A 11/2010
JP 2014-051389 A 3/2014

* cited by examiner

*Primary Examiner* — David H Banh
(74) *Attorney, Agent, or Firm* — XSENSUS LLP

(57) ABSTRACT

A sheet conveying device includes a conveyor, a curved conveyance passage, a conveyance sensor, and processing circuitry. The conveyor conveys a sheet. The sheet is conveyed by the conveyor along the curved conveyance passage. The conveyance sensor detects a presence of the sheet and is disposed at a curved position of the conveyance passage. The processing circuitry determines clogging of the sheet from an output result of the conveyance sensor. When a specific type of the sheet is conveyed, the processing circuitry stops determination of clogging of the sheet for a period of time from when the conveyance sensor detects passage of a leading end of the sheet to when a trailing end of the sheet passes the conveyance sensor.

9 Claims, 8 Drawing Sheets

SHEET CONVEYING DEVICE AND IMAGE FORMING APPARATUS INCORPORATING THE SAME

CROSS-REFERENCE TO RELATED APPLICATIONS

This patent application is based on and claims priority pursuant to 35 U.S.C. § 119(a) to Japanese Patent Application Nos. 2023-045270, filed on Mar. 22, 2023, and 2023-195473, filed on Nov. 16, 2023 in the Japan Patent Office, the entire disclosure of which is hereby incorporated by reference herein.

BACKGROUND

Technical Field

Embodiments of the present disclosure relate to a sheet conveying device and an image forming apparatus incorporating the sheet conveying device.

Related Art

In order to prevent an erroneous determination of a sheet jam due to non-detection of a sensor for a transparent sheet such as an overhead projector (OHP) sheet, some technologies are proposed for setting a sheet-jam detection deactivation period in which a determination of the sheet jam is stopped from the detection of a leading end of a sheet with a sensor to a timing earlier than when a trailing end of the sheet passes the sensor.

SUMMARY

In an embodiment of the present disclosure, there is provided a sheet conveying device that includes a conveyor, a curved conveyance passage, a conveyance sensor, and processing circuitry. The conveyor conveys a sheet. The sheet is conveyed by the conveyor along the curved conveyance passage. The conveyance sensor detects a presence of the sheet and is disposed at a curved position of the conveyance passage. The processing circuitry determines clogging of the sheet from an output result of the conveyance sensor. When a specific type of the sheet is conveyed, the processing circuitry stops determination of clogging of the sheet for a period of time from when the conveyance sensor detects passage of a leading end of the sheet to when a trailing end of the sheet passes the conveyance sensor.

In another embodiment of the present disclosure, there is provided an image forming apparatus that includes the sheet conveying device and an image forming device to form an image on the sheet.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
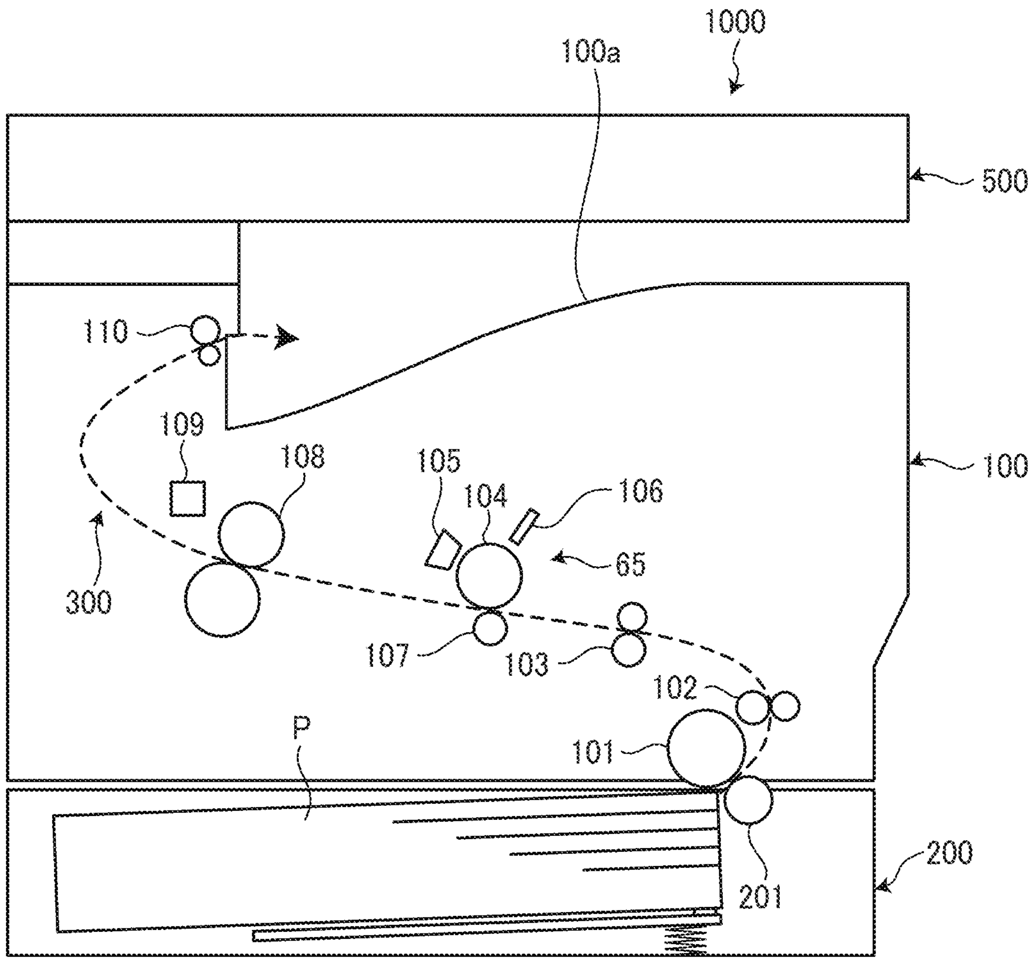
FIG. 1 is a schematic view of a multifunction peripheral (MFP) according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A description is given below in detail of a sheet conveying device and an image forming apparatus according to an embodiment of the present disclosure with reference to the accompanying drawings.

FIG. 1 is a schematic view of a multifunction peripheral (MFP) 1000 according to an embodiment of the present disclosure. In the present embodiment, the MFP 1000 that has at least two functions of a copy function, a printer function, a scanner function, and a facsimile function is applied as a sheet conveying device and an image forming apparatus. The MFP 1000 includes a printer 100 and a scanner 500.

As illustrated in FIG. 1, the printer 100 includes a sheet feed roller 101, a relay roller 102, a registration roller 103, a photoconductor 104, a charger 105, a light emitting diode (LED) 106, a transfer roller 107, a fixing roller 108, a conveyance sensor 109, and a sheet ejection roller 110.

The printer 100 includes a sheet feeder 200 at a lower portion. The printer 100 houses the sheet feeder 200 therein.

A sheet P, which is a sheet-shaped object to be conveyed, is fed from the sheet feeder 200 to the printer 100 by a separation roller 201 included in the sheet feeder 200 and the sheet feed roller 101 included in the printer 100. In other words, the sheet feeder 200 including the separation roller 201 constitutes a sheet feeder in the printer 100.

The sheet P sent from the sheet feeder 200 is conveyed by the relay roller 102, the registration roller 103, and the sheet ejection roller 110 to a conveyance passage 300 that forms a curved passage as indicated by a dashed arrow in FIG. 1.

The sheet P conveyed by the relay roller 102 temporarily stops at the registration roller 103 to form slack therein.

The sheet feed roller 101, the relay roller 102, the registration roller 103, and the sheet ejection roller 110 constitute at least part of a sheet conveyor 66 (see FIG. 3) that is an example of a conveyor that conveys the sheet P. A motor that is an example of a driving source is driven based on an instruction signal from a controller 61 (see FIG. 3), and a driving force of the motor is transmitted to the sheet conveyor 66 to convey the sheet P. The sheet conveyor 66 conveys the sheet P to an image forming device 65 formed by, for example, the photoconductor 104, and then ejects the sheet P.

The printer 100 includes, around the photoconductor 104, the charger 105 that charges the surface of the photoconductor 104 and the LED 106 as a light source that exposes, based on image information, the surface of the charged photoconductor 104 to form an electrostatic latent image on the surface of the photoconductor 104. The photoconductor 104, the charger 105, and the LED 106 are constituent elements of the image forming device 65 that forms an image by an electrophotographic method. The printer 100 forms an image to be transferred onto the sheet P by the operation of the image forming device 65 formed by, for example, the photoconductor 104.

The printer 100 causes the registration roller 103 to start conveying the sheet P with respect to a toner image formed on the photoconductor 104 at a specified timing. Thus, the printer 100 conveys the sheet P to a nip between the photoconductor 104 and the transfer roller 107 disposed opposite the photoconductor 104, and transfers the toner image on the photoconductor 104 onto the sheet P.

The image forming device 65 is not limited to the one that forms an image by an electrophotographic method as described above, and may be an image forming device that forms an image by another method such as an inkjet method.

Thereafter, the printer 100 conveys the sheet P to the fixing roller 108, the toner image transferred by the fixing roller 108 is heated (pressed) and fixed, and then the sheet P is further conveyed downstream by the fixing roller 108 and ejected, via the sheet ejection roller 110, onto an output tray 100*a* disposed on an upper surface of a housing of the printer 100.

The printer 100 generally controls driving timings of the respective rollers (the sheet feed roller 101, the relay roller 102, the registration roller 103, and the sheet ejection roller 110) using the conveyance sensor 109. Specifically, while the printer 100 detects the sheet P using the conveyance sensor 109 (e.g., a reflection-type photosensor) that optically detects the presence of the sheet P, the printer 100 outputs a detection signal to the controller 61 to be described below (see FIG. 3).

The conveyance sensor 109 is disposed at a position where the conveyance passage 300 of the sheet P is curved. As the conveyance sensor 109, a sensor (a fixing exit sensor) may be used that is disposed downstream from the fixing roller 108, which is an example of a fixing device, in a conveyance direction and detects a sheet jam due to winding of the sheet P around the fixing roller 108 instead of a sensor dedicated to sheet detection.

Figure 2:
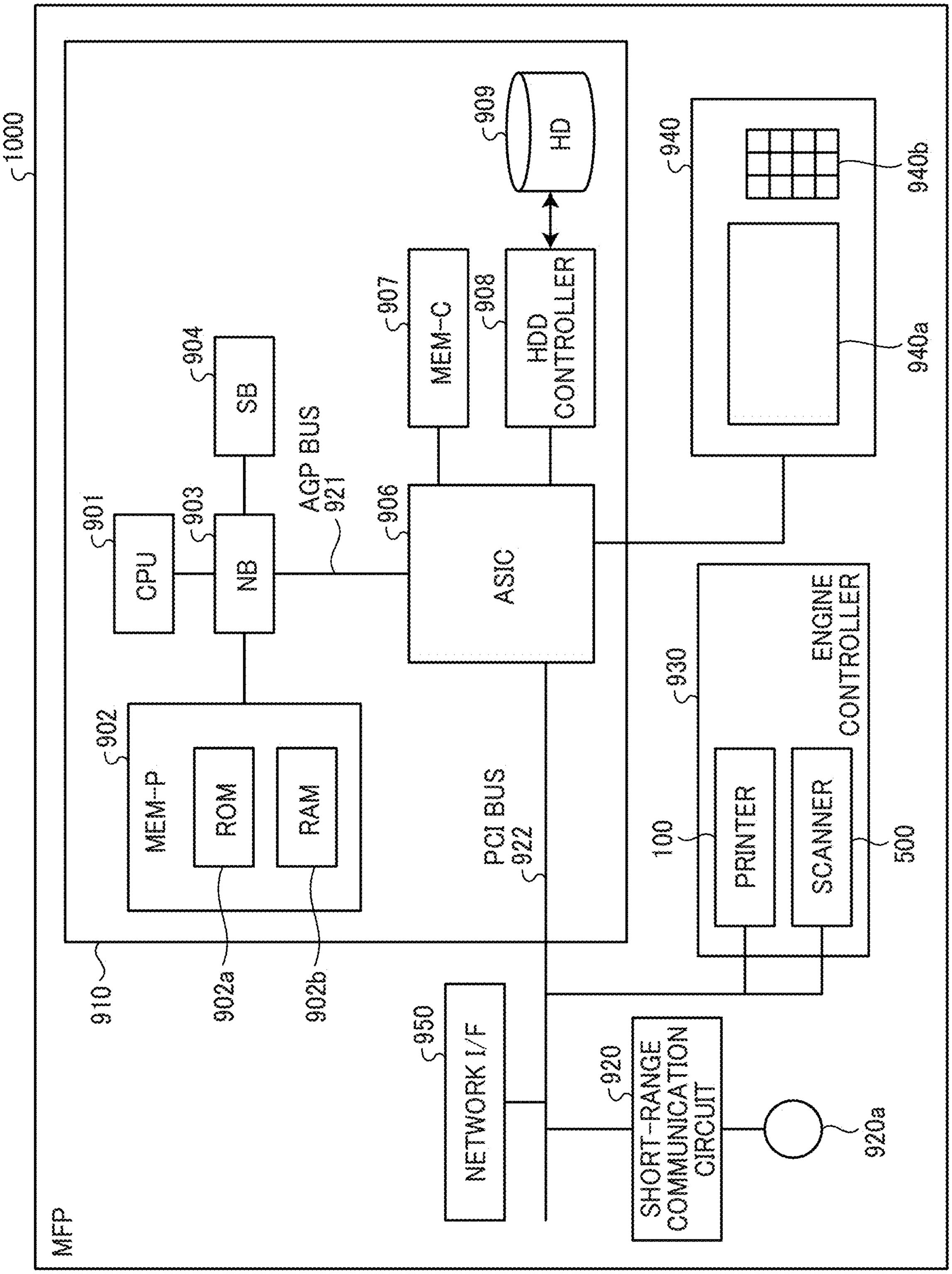
FIG. 2 is a diagram of a hardware configuration of the MFP in FIG. 1.

FIG. 2 is a diagram of a hardware configuration of the MFP 1000. As illustrated in FIG. 2, the MFP 1000 includes a controller 910, a short-range communication circuit 920, an engine controller 930, an operation panel 940, and a network interface (I/F) 950.

The controller 910, which is an example of processing circuitry, includes a central processing unit (CPU) 901 that is a main part of a computer, a system memory (MEM-P) 902, a northbridge (NB) 903, a southbridge (SB) 904, an application-specific integrated circuit (ASIC) 906, a local memory (MEM-C) 907 that is a storage, a hard disk drive (HDD) controller 908, and a hard disk (HD) 909 that is a storage. The NB 903 and the ASIC 906 are connected to each other by an accelerated graphics port (AGP) bus 921.

The CPU 901 is a controller that performs overall control of the MFP 1000. The NB 903 connects the CPU 901, with the MEM-P 902, the SB 904, and the AGP bus 921. The NB 903 includes a memory controller for controlling reading or writing of various data with respect to the MEM-P 902, a peripheral component interconnect (PCI) master, and an AGP target.

The MEM-P 902 includes a ROM 902*a* as a memory that stores programs and data for implementing various functions of the controller 910. The MEM-P 902 further includes a RAM 902*b* as a memory that deploys the programs and data, or as a drawing memory that stores drawing data for printing. The program stored in the RAM 902*b* may be stored in any computer-readable storage medium, such as a compact disc-read-only memory (CD-ROM), compact disc-recordable (CD-R), or digital versatile disc (DVD), in a file format installable or executable by the computer, for distribution.

The SB 904 is a bridge that connects the NB 903 to a PCI device and a peripheral device. The ASIC 906 is an integrated circuit (IC) for image processing having hardware elements for image processing, and plays a role of a bridge connecting each of the AGP bus 921, a PCI bus 922, the HDD controller 908, and the MEM-C 907. The ASIC 906 includes a PCI target, an AGP master, an arbiter (ARB) as a central processor of the ASIC 906, a memory controller, multiple direct memory access controllers (DMACs), and a PCI unit. The memory controller controls the MEM-C 907. The DMACs convert coordinates of image data with a hardware logic. The PCI unit transfers data between the scanner 500 and the printer 100 through the PCI bus 922. An interface of a universal serial bus (USB) or an interface of an institute of electrical and electronics engineers 1394 (IEEE 1394) may be connected to the ASIC 906.

The MEM-C 907 is a local memory used as an image buffer for copying and a code buffer. The HD 909 is a storage that stores various image data, font data for printing, and form data. The HDD controller 908 reads or writes various data from or to the HD 909 under control of the CPU 901. The AGP bus 921 is a bus interface for a graphics accelerator card, which is proposed to accelerate graphics processing. Through directly accessing the MEM-P 902 by high-throughput, the speed of the graphics accelerator card is increased.

The short-range communication circuit 920 further includes a short-range communication circuit 920*a*. The short-range communication circuit 920 is a communication circuit such as a near field communication (NFC) and a Bluetooth®.

The engine controller 930 includes the scanner 500 and the printer 100. The operation panel 940 includes a panel display 940*a* and an operation panel 940*b*. The panel display 940*a* is, for example, a touch screen that displays current settings or a selection screen and that receives the user input. The operation panel 940*b* includes, for example, a numeric keypad and a start key. The numeric keypad receives set values of various image forming parameters such as an image density parameter. The start key receives an instruction to start copying. The controller 910 controls the overall operations of the MFP 1000. For example, the controller 910 controls drawing, communication, or user inputs to the operation panel 940. The scanner 500 or the printer 100 includes an image processing unit for performing various image processing, such as error diffusion or gamma conversion.

In response to an instruction to select a specific application through the operation panel 940, the MFP 1000 selectively performs a document box function, a copy function, a print function, and a facsimile function. In response to the selection of the document box function, the image forming apparatus 3 operates in a document box mode. In response to the selection of the copier function, the image forming apparatus 3 operates in a copier mode. In response to the selection of the printer function, the image forming apparatus 3 operates in printer mode. In response to the selection of the facsimile function, the image forming apparatus 3 operates in a facsimile mode.

The network I/F 950 is an interface that controls communication of data through a communication network. The short-range communication circuit 920 and the network I/F 950 are electrically connected to the ASIC 906 through the PCI bus 922.

Next, a description is given of a functional configuration of the MFP 1000.

Figure 3:
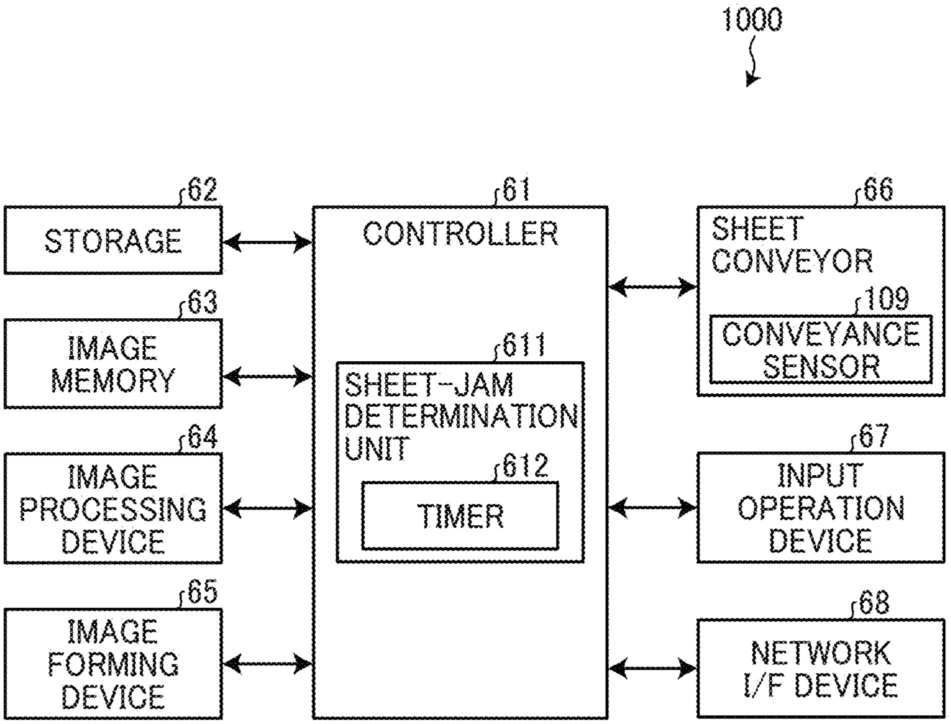
FIG. 3 is a block diagram illustrating a functional configuration of the MFP in FIG. 1.

FIG. 3 is a block diagram illustrating a functional configuration of the MFP 1000. As illustrated in FIG. 3, the MFP 1000 includes a controller 61, a storage 62, an image memory 63, an image processing device 64, an image forming device 65, a sheet conveyor 66, an input operation device 67, and a network I/F device 68. The controller 61 connects the storage 62, the image memory 63, the image processing device 64, the image forming device 65, the sheet conveyor 66, the input operation device 67, and the network I/F device 68 with each other.

The controller 61 includes the CPU 901 illustrated in FIG. 2. The controller 61 reads a program stored in the storage 62, performs various processing (e.g., output of instruction signals to the respective functional sections, output of instruction signals for driving the sheet conveyor 66, and data transfer), and comprehensively controls the respective sections of the MFP 1000.

The controller 61 includes a sheet-jam determination unit 611 that functions as a determination unit. The sheet-jam determination unit 611 also includes a timer 612 that counts time.

The sheet-jam determination unit 611 captures the detection signal output from the conveyance sensor 109 and determines whether a sheet jam of the sheet P occurs. For example, the sheet-jam determination unit 611 determines that a sheet jam has occurred at the upstream side from the conveyance sensor 109 in a case where no detection signal is output from the conveyance sensor 109 even after a specified time has elapsed according to the count of the timer 612.

The storage 62 stores programs and data for realizing various functions of the MFP 1000. The storage 62 corresponds to, for example, the local memory (MEM-C) 907 and the HD 909 illustrated in FIG. 2.

The image memory 63 temporarily stores image data transmitted from an external device via the network I/F device 68. The image memory 63 corresponds to, for example, the RAM 902*b* illustrated in FIG. 2.

The image processing device 64 performs image processing, such as image correction, enlargement, and reduction, on the image data stored in the image memory 63. The image processing device 64 corresponds to, for example, the ASIC 906 illustrated in FIG. 2.

The input operation device 67 functions as a selection device, and includes a power key, a numeric keypad, and a panel for displaying various messages and inputting paper-type information (information on the type of a sheet-shaped object to be conveyed). In the present embodiment, a description is given of a case where a user inputs paper-type information by the input operation device 67 which is an example of a selection device. However, the method of obtaining the paper-type information is not limited to this, and a paper-type sensor may be used that reads a sheet to be printed by a sensor to automatically identify paper-type information. The input operation device 67 corresponds to, for example, the operation panel 940 illustrated in FIG. 2.

The network I/F device 68 includes a communication module such as a local area network (LAN) board. The network I/F device 68 transmits and receives various types of data to and from an external device connected to the network I/F device 68. The network I/F device 68 corresponds to, for example, the short-range communication circuit 920 and the network I/F 950 illustrated in FIG. 2.

Next, problems of a comparative example are described below.

Ideally, the conveyance sensor 109 is disposed such that an optical axis of light emitted from the conveyance sensor 109 is perpendicular (an ideal angle of 90 degrees) with respect to the sheet P being conveyed. This is because the conveyance sensor 109 may not be able to detect the sheet P when an angle formed by the optical axis of the conveyance sensor 109 and the sheet P exceeds a certain threshold value.

For example, white paper has a wide detectable angle, whereas black paper has a narrower detectable angle than the white paper, and furthermore, an overhead projector (OHP) sheet that is a transparent sheet has an extremely narrow detectable angle. In a case where the detectable angle is narrow as described above, for example, when the conveyance sensor 109 is disposed with an inclination of around 15 to 20 degrees with respect to the ideal angle of 90 degrees between the optical axis of the conveyance sensor 109 and the sheet P, the sheet P may not be detectable by the conveyance sensor 109.

When the sheet P cannot be detected by the conveyance sensor 109 as described above, for example, the sheet P cannot be detected even though the sheet P (e.g., an OHP sheet) is positioned in front of the conveyance sensor 109. Thus, an erroneous determination may be performed that a sheet jam of the sheet P has occurred.

On the other hand, as in the printer 100 of the present embodiment, there is a case where the conveyance sensor 109 is disposed on the curved conveyance passage 300 on which the optical axis of the conveyance sensor 109 cannot be arranged vertically (at an ideal angle of 90 degrees) with respect to the sheet P.

Figure 4A:
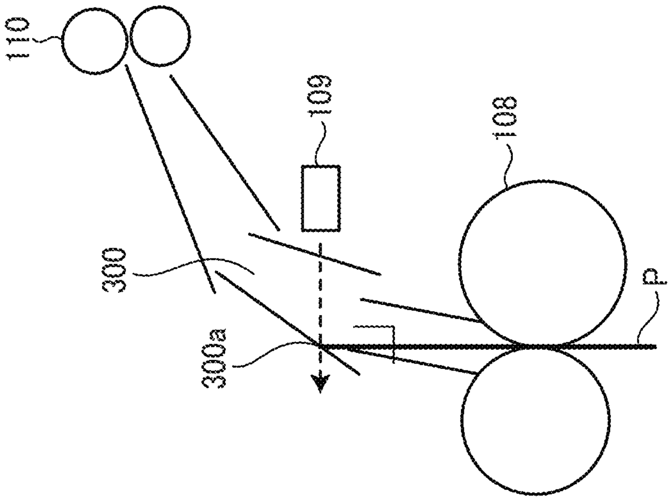
FIGS. 4A, 4B, and 4C are schematic views of a curved conveyance passage in which a sheet is being conveyed along the curved conveyance passage.
Figure 4B:
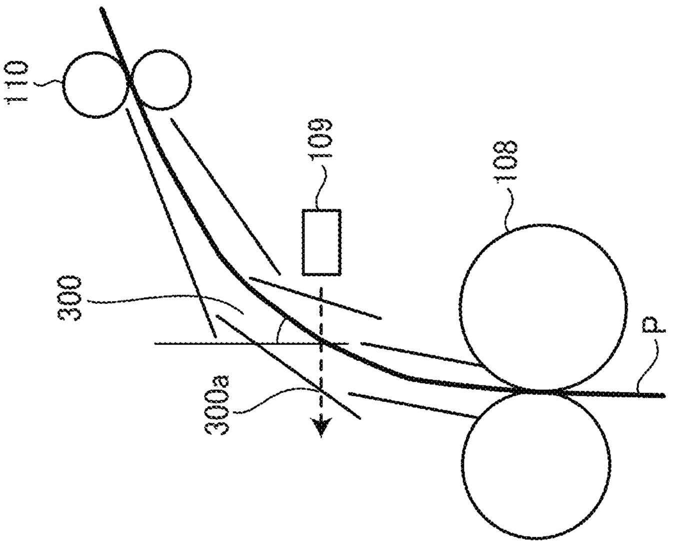
Figure 4C:
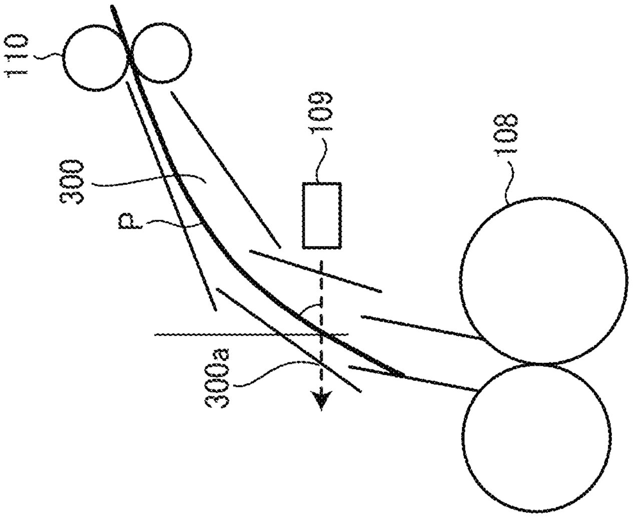
Figure 5:
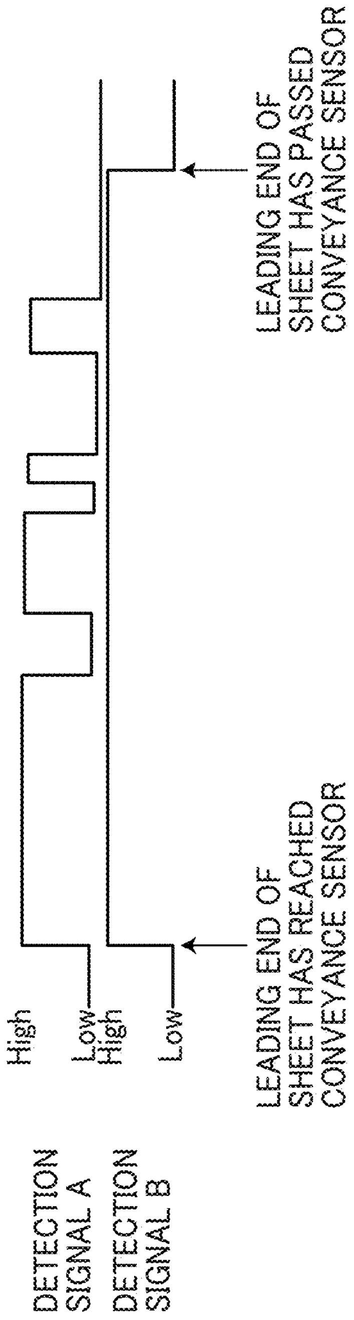
FIG. 5 is a diagram illustrating an example of a detection signal of a conveyance sensor when a sheet is conveyed.

FIGS. 4A, 4B, and 4C are diagram illustrating a sheet P conveyed along the curved conveyance passage 300, and FIG. 5 is a diagram illustrating an example of detection signals from the conveyance sensor 109 when the sheet P has been conveyed. More specifically, FIGS. 4A, 4B, and 4C stepwisely illustrate the sheet P conveyed through the curved conveyance passage 300 from the fixing roller 108 to the sheet ejection roller 110. FIG. 5 illustrates detection signals of the conveyance sensor 109 at the respective positions of the sheet P in FIGS. 4A, 4B, and 4C.

In FIG. 5, a detection signal A represents an example in which an OHP sheet is used as the sheet P, and a detection signal B represents an example in which a plain paper (other than a transparent sheet, such as white paper and black paper) is used as the sheet P. In FIG. 5, a high level of the detection signal indicates that the conveyance sensor 109 detects the sheet P, and a low level of the detection signal indicates that the conveyance sensor 109 does not detect the sheet P.

As illustrated in FIGS. 4A, 4B, and 4C, a guide surface 300*a* of the conveyance passage 300 on a line extended from the optical axis of the light emitted from the conveyance sensor 109 is inclined with respect to the optical axis of the conveyance sensor 109.

As illustrated in FIGS. 4A, 4B, and 4C, in the conveyance passage 300 (the passage between the fixing roller 108 and the sheet ejection roller 110), a conveyance passage (a passage between the conveyance sensor 109 and the sheet ejection roller 110) downstream from the conveyance sensor 109 in the conveyance direction has a greater degree of curvature or inclination angle than a conveyance passage (the passage between the fixing roller 108 and the conveyance sensor 109) upstream in the conveyance direction from the position (the position corresponding to the conveyance sensor 109) at which the extended line of the optical axis of the light emitted from the conveyance sensor 109 intersects the guide surface 300*a* of the conveyance passage 300.

FIG. 4A illustrates a state where the sheet P is conveyed from the fixing roller 108 and a leading end of the sheet P has reached the optical axis of the conveyance sensor 109, in other words, a state where the leading end of the sheet P has reached a detection range of the conveyance sensor 109. In the state illustrated in FIG. 4A, the leading end of the sheet P is being conveyed vertically with respect to the optical axis of the conveyance sensor 109, and thus the conveyance sensor 109 can detect the leading end of the sheet P whether the sheet P is white paper, black paper, or OHP sheet. In other words, in the state illustrated in FIG. 4A, the detection signal A and the detection signal B turn to be at a high level as illustrated in FIG. 5.

FIG. 4B illustrates a state in which the sheet P is conveyed from the fixing roller 108 and a leading end of the sheet P reaches the sheet ejection roller 110. In the state illustrated in FIG. 4B, the sheet P is conveyed diagonally with respect to the optical axis of the conveyance sensor 109. At this time, when an angle formed by the optical axis of the conveyance sensor 109 and the sheet P exceeds a threshold value for detection of the sheet P, the detection of the sheet P by the conveyance sensor 109 destabilizes, and thus correct detection cannot be performed. For example, in a case where an OHP sheet is used as the sheet P, when the sheet P continues to be conveyed at angles close to the threshold value, the high level and the low level are repeated as indicated by the detection signal A illustrated in FIG. 5. On the other hand, in a case where plain paper (other than transparent paper, such as white paper and black paper) is used as the sheet P, even if the sheet P continues to be conveyed at angles close to the threshold value, the high level is continuously maintained as indicated by the detection signal B illustrated in FIG. 5.

FIG. 4C illustrates a state immediately before the trailing end of the sheet P passes through the fixing roller 108. In the state illustrated in FIG. 4C, an angle of the sheet P with respect to the optical axis of the conveyance sensor 109 further increases. When an OHP sheet is used as the sheet P, the sheet P cannot be continuously detected by the conveyance sensor 109, and the low level continues as indicated by the detection signal A illustrated in FIG. 5. On the other hand, when plain paper (other than transparent paper, such as white paper and black paper) is used as the sheet P, the detection signal changes to the low level as indicated by the detection signal B illustrated in FIG. 5, at a timing when the trailing end of the sheet P has passed the conveyance sensor 109.

As described above, in the printer 100, the controller 61 receives the detection signal output from the conveyance sensor 109, and the sheet-jam determination unit 611 determines whether the sheet P is jammed based on the presence of the detection signal. As described above, in a case where an OHP sheet is used as the sheet P, the detection of the sheet P by the conveyance sensor 109 cannot be correctly performed. Accordingly, even though the sheet P is placed in front of the conveyance sensor 109, the controller 61 (the sheet-jam determination unit 611) erroneously detects that the sheet P has rapidly passed the conveyance sensor 109 (the sheet P is short), and thus stops the printer 100. This erroneous detection interferes with stable continuous conveyance of sheets and causes a decline in productivity.

For this reason, in the present embodiment, when specific paper-type information (type information of the sheet-shaped object to be conveyed) is selected with the input operation device 67, the printer 100 stops the sheet-jam determination of the sheet P until the trailing end of the sheet P has passed the conveyance sensor 109 after the printer 100 detects that the leading end of the sheet P has reached the conveyance sensor 109. In other words, the sheet-jam determination of the sheet P is stopped including the timing at which the trailing end of the sheet P passes the conveyance sensor 109. Accordingly, even if the detection signal changes to a low level due to erroneous detection by the conveyance sensor 109 during conveyance of the sheet P, conveyance of the sheet P is continued without determining a sheet jam.

Figure 6:
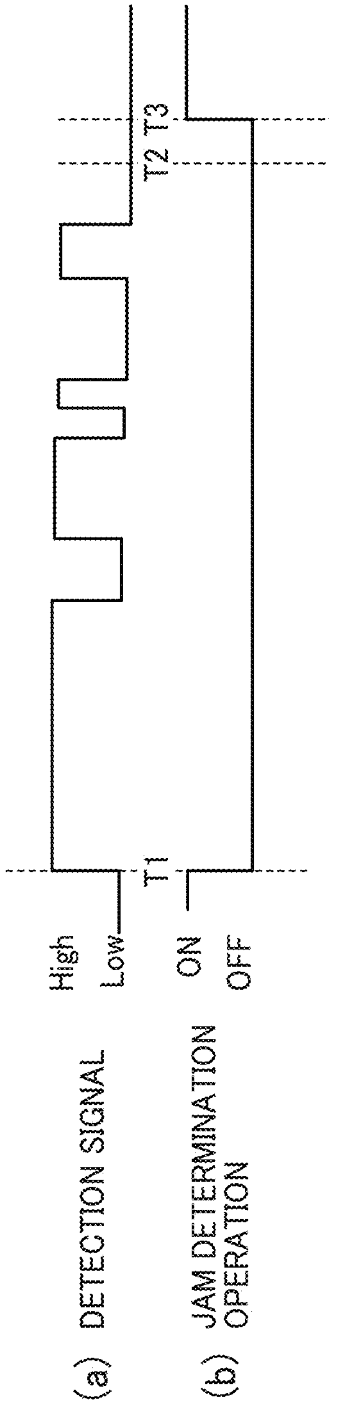
FIG. 6 is a diagram illustrating an example of determination by a sheet-jam determination unit.

FIG. 6 is a diagram illustrating an example of determination by the sheet-jam determination unit 611. FIG. 6A illustrates an example of a detection signal when an OHP sheet is used as the sheet P, and FIG. 6B illustrates an example of "ON/OFF" operation of a sheet-jam determination operation by the sheet-jam determination unit 611. In FIG. 6, a time when the sheet-jam determination operation is "ON" is a period in which the sheet-jam determination unit 611 determines whether a sheet jam has occurred using a detection signal, and a time when the sheet-jam determination operation is "OFF" is a period in which the determination of whether a sheet jam has occurred is stopped.

As illustrated in FIG. 6, the sheet-jam determination unit 611 turns "OFF" the sheet-jam determination operation at a timing (T1) when the conveyance sensor 109 detects that the leading end of the sheet P has reached the conveyance sensor 109, and then the sheet-jam determination operation based on a detection signal is not performed. With such a configuration, even if the detection signal repeats the signal change of "High/Low" due to the erroneous detection of the conveyance sensor 109 during a period in which the sheet-jam determination operation is turned "OFF", the sheet-jam determination unit 611 does not determine that the sheet P is jammed and does not also stop the operation of the printer 100.

As illustrated in FIG. 6, the sheet-jam determination unit 611 turns "ON" the sheet-jam determination operation (T3) after a timing (T2) at which the trailing end of the sheet P has passed the conveyance sensor 109. The timing (T2) at which the trailing end of the sheet P has passed the conveyance sensor 109 is calculated and set according to the length of the sheet P in the conveyance direction and the conveyance speed of the sheet P. With such a configuration, when a sheet jam of the sheet P has actually occurred and the detection signal continues to be at the "High" level, the sheet-jam determination unit 611 determines that a sheet jam of the sheet P has occurred, stops the printer 100, and alerts a user of the occurrence of the sheet jam of the sheet P.

The timing (T2) at which the trailing end of the sheet P has passed the conveyance sensor 109 varies according to the sheet size. The timing (T2) is determined in advance for each size of the sheet P and is stored in advance in the storage 62 or a work memory in the controller 61. The timing (T2) at which the trailing end of the sheet P has passed the conveyance sensor 109 may be set to be slightly longer than a value calculated from the length of the sheet P in the conveyance direction and the conveyance speed of the sheet P, in consideration of, for example, variations in the sheet length, variations in detection by the conveyance sensor 109, and variations in conveyance speed of the sheet P.

The above-described control of the sheet-jam determination unit 611 is applied only in a case where a specific paper type such as an OHP sheet and a black sheet, in which erroneous detection of the conveyance sensor 109 is likely to occur, is used as the sheet P. With such a configuration, in the case of a paper type such as plain paper that does not cause erroneous detection by the conveyance sensor 109, a signal change from the "High" level to the "Low" level of the detection signal can be detected at an earlier timing than the timing T2 to alert a user of a conveyance abnormality, for example, when a sheet P shorter than a set length is passed.

Subsequently, a description is given of a sheet-jam determination process below.

Figure 7:
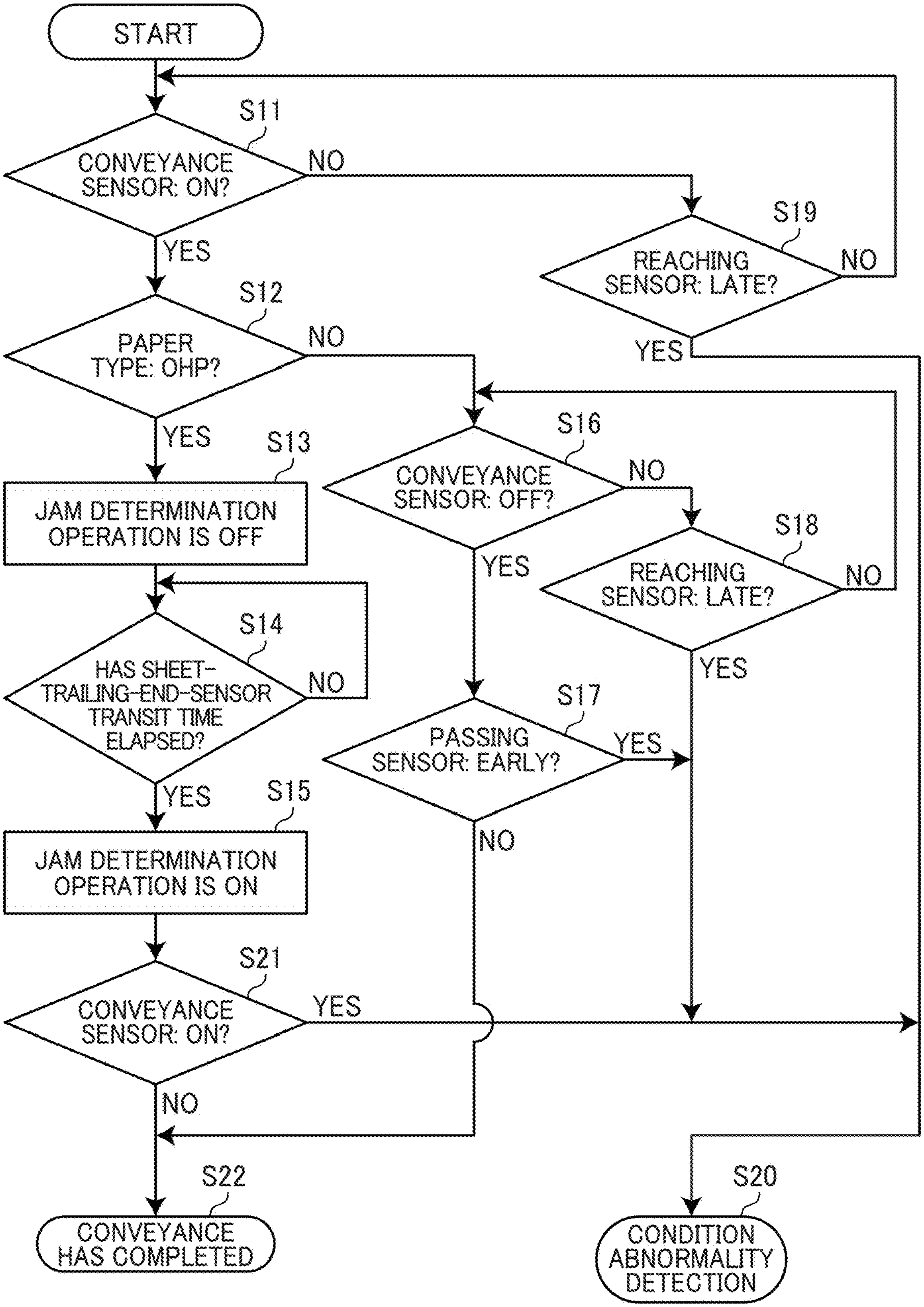
FIG. 7 is a flowchart of a sheet-jam determination process of the sheet-jam determination unit.

FIG. 7 is a flowchart of the sheet-jam determination process. As illustrated in FIG. 7, first, when the conveyance of a sheet P starts, the sheet-jam determination unit 611 determines whether a detection signal has been output by the conveyance sensor 109 (step S11 in FIG. 7).

When the conveyance sensor 109 is not turned on for a specified time or more (NO in step S11 and YES in step S19 in FIG. 7), the sheet-jam determination unit 611 determines that the sheet P is jammed as a clogging of the sheet (step S20 in FIG. 7).

On the other hand, when the conveyance sensor 109 is turned "ON" and the detection signal is output from the conveyance sensor 109 (YES in step S11 in FIG. 7), the sheet-jam determination unit 611 determines whether the paper type is one in which erroneous detection by the conveyance sensor 109 may occur (step S12 in FIG. 7). The paper type is tentatively described as an OHP sheet in FIG. 7. However, substantially the same control is also performed for another paper type (e.g., black paper) that may be erroneously detected.

When the paper type is the OHP sheet (YES in step S12 in FIG. 7), the sheet-jam determination unit 611 turns "OFF" the sheet-jam determination operation (step S13 in FIG. 7).

Subsequently, the sheet-jam determination unit 611 determines whether a time (T2), which is calculated from the length of the sheet P in the conveyance direction and conveyance speed of the sheet P and at which the trailing end of the sheet P passes the conveyance sensor 109, has elapsed (step S14 in FIG. 7). When the time (T2) required for the trailing end of the sheet P to pass the conveyance sensor 109 (YES in step S14 in FIG. 7) elapses, the sheet-jam determination unit 611 changes the sheet-jam determination operation to "ON" again (step S15 in FIG. 7).

Thereafter, when the conveyance sensor 109 is turned "OFF" (NO in step S21 in FIG. 7), the sheet-jam determination unit 611 determines that the sheet P has been normally ejected, and then the conveyance of the sheet P is completed (step S22 in FIG. 7). On the other hand, when the conveyance sensor 109 continues to be turned "ON" after the lapse of the time (T2) required for the trailing end of the sheet P to pass the conveyance sensor 109 (YES in step S21 in FIG. 7), a sheet jam of the sheet P may occur, and thus the sheet-jam determination unit 611 determines that a sheet jam has occurred (step S20 in FIG. 7).

On the other hand, when the paper type is not the OHP sheet (NO in step S12 in FIG. 7), the sheet-jam determination unit 611 determines whether the conveyance sensor 109 does not detect the sheet P and is "OFF" (step S16 in FIG. 7).

When the conveyance sensor 109 does not detect the sheet P and is "OFF" (YES in step S16 in FIG. 7), the sheet-jam determination unit 611 determines whether a time at which the conveyance sensor 109 is turned "OFF" is early (step S17 in FIG. 7).

When a time at which the conveyance sensor 109 is turned "OFF" is early (YES in step S17 in FIG. 7), a sheet jam of the sheet P may occur, and thus the sheet-jam determination unit 611 determines that an abnormal state has been detected (a sheet jam or a sheet setting error has occurred) (step S20 in FIG. 7). On the other hand, when a time at which the conveyance sensor 109 is turned to be "OFF" is late (NO in step S17 in FIG. 7), the sheet-jam determination unit 611 determines that the sheet P has been normally ejected, and then the conveyance of the sheet P is completed (step S22 in FIG. 7).

In addition, when the conveyance sensor 109 detects the sheet P and is "ON" (NO in step S16 in FIG. 7) and when a time at which the conveyance sensor 109 is turned "OFF" is late (YES in step S18 in FIG. 7), a sheet jam of the sheet P may occur, and thus the sheet-jam determination unit 611 determines that a sheet jam has occurred (step S20 in FIG. 7).

Figure 8:
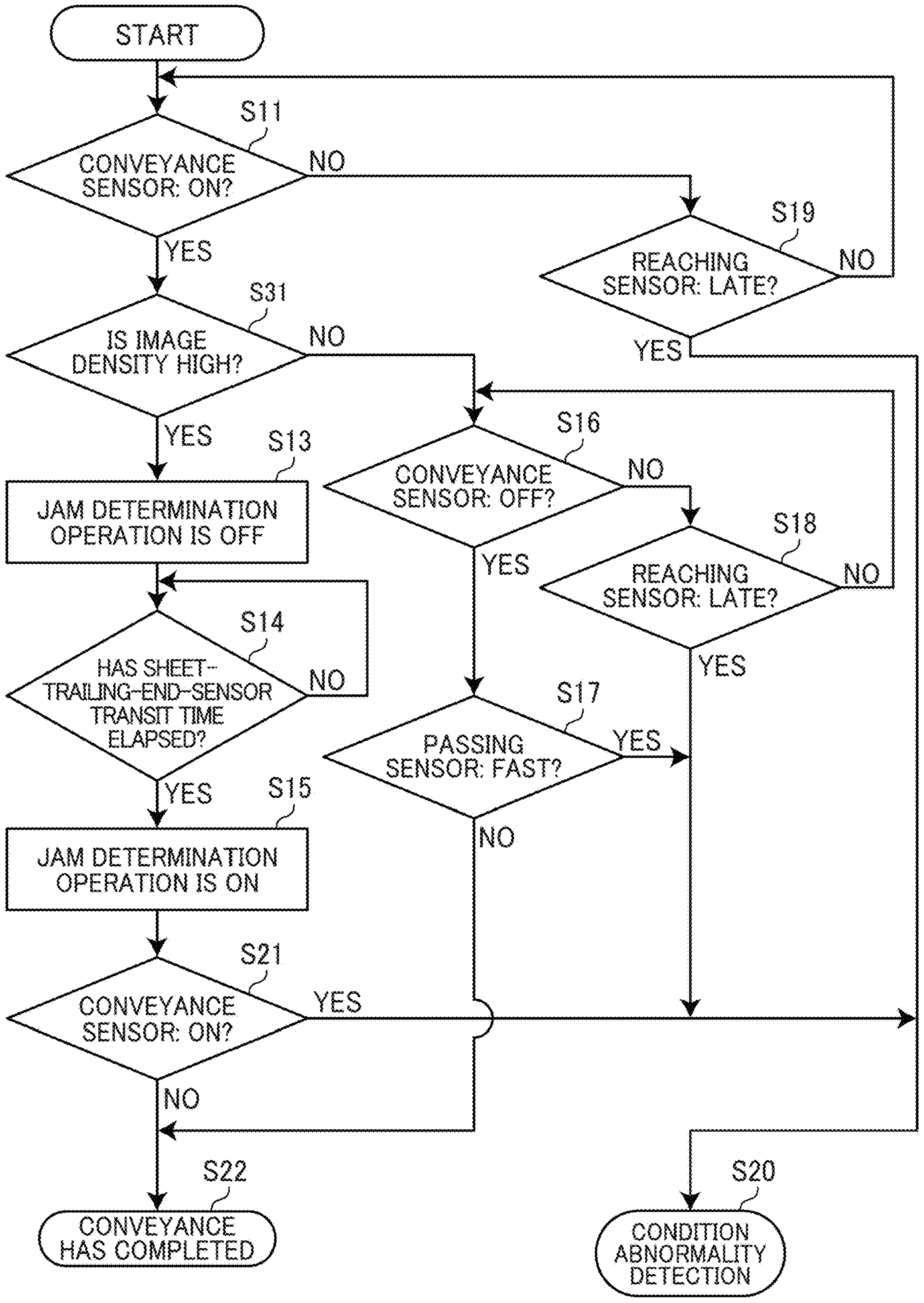
FIG. 8 is a flowchart of a sheet-jam determination process according to a modification.

In FIG. 7, the control is switched according to the paper type in which erroneous detection may occur. However, even with black sheet, erroneous detection by the conveyance sensor 109 may occur. FIG. 8 is a flowchart of the sheet-jam determination process according to a modification of an embodiment of the present disclosure. Instead of determining whether the paper type is one in which erroneous detection by the conveyance sensor 109 may occur as described in FIG. 7 (step S12 in FIG. 7), as illustrated in FIG. 8, the sheet-jam determination unit 611 may determine whether an image density to be printed (a value calculated from image data to be printed) is equal to or more than a certain value (step S31 in FIG. 7) and switch controls.

Even under the control illustrated in FIG. 7 or FIG. 8, in a case where an erroneous detection has occurred in the detection by the conveyance sensor 109 after the restart of the sheet-jam determination operation (when the detection signal is at a "Low" level even if a sheet P is positioned in front of the conveyance sensor 109), the occurrence of a sheet jam of the sheet P cannot be determined even if the sheet jam has actually occurred. Accordingly, when a specific paper type is selected, it is preferable that the controller 61 (see FIG. 3) drives the sheet conveyor 66 to convey the jammed sheet P downstream from the conveyance sensor 109 in the conveyance direction before starting conveyance of the sheet P (before starting a printing operation in the case of an image forming apparatus). Specifically, a roller rotation time is provided in which the rollers (the sheet feed roller 101, the relay roller 102, the registration roller 103, and the sheet ejection roller 110) constituting the sheet conveyor 66 are rotated in a direction in which the sheet P is conveyed downstream in the conveyance direction. Accordingly, a jammed sheet P is conveyed to a sensor disposed downstream from the conveyance sensor 109 in the conveyance direction, and the sheet-jam determination unit 611 determines whether the sheet P is jammed by the sensor disposed downstream in the conveyance direction. The sheet P may be conveyed downstream from the conveyance sensor 109 in the conveyance direction and may be ejected to the outside of the apparatus.

As described above, according to the present embodiment, when a specific paper type is selected, the determination of a sheet jam of the sheet P is stopped until the trailing end of the sheet P passes the conveyance sensor 109 after the leading end of the sheet P reaches the conveyance sensor 109. Thus, even if a detection signal is turned "OFF" by erroneous detection of the conveyance sensor 109 during conveyance of the sheet P, the conveyance of the sheet P can be continued without determining that a sheet jam of the sheet P has occurred. Such a configuration can prevent erroneous detection even if a sheet P cannot be correctly detected except for the arrival of the leading end of the sheet P at the conveyance sensor 109 (i.e., a sheet P cannot be correctly detected whether the sheet P is being conveyed or whether the trailing end of the sheet has passed the conveyance sensor 109). As a result, the conveyance of the sheet P can be normally continued without unnecessarily stopping the printer 100, and thus a decrease in printing productivity can be prevented.

Figure 9:
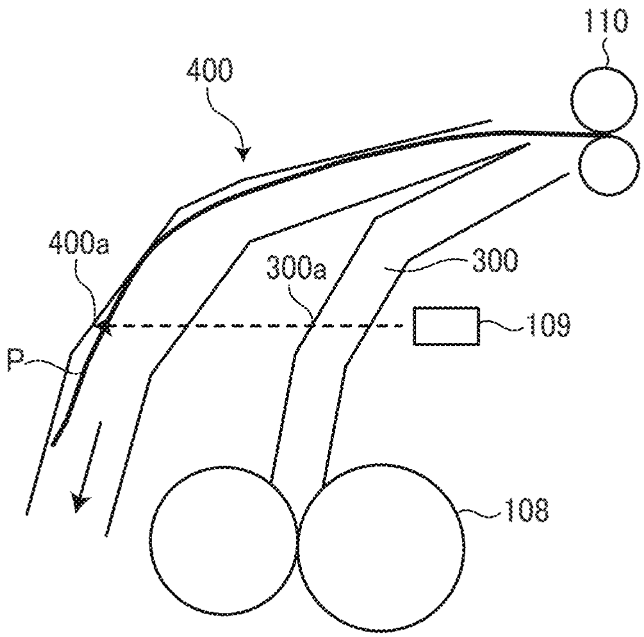
FIG. 9 is a schematic view of a conveyance passage and a duplex conveyance passage provided with a sensor.

The conveyance passage 300 that is curved (bent) for single-sided printing is described in the present embodiment, but examples of the conveyance passage are not limited thereto. FIG. 9 is a diagram illustrating an example in which a conveyance passage 300 and a duplex conveyance passage 400 are disposed.

As illustrated in FIG. 9, the printer 100 includes the duplex conveyance passage 400 for two-sided printing at a position facing the conveyance passage 300 in a direction orthogonal to the surface of the sheet P conveyed through the conveyance passage 300 (the left-and-right direction of FIG. 9). A guide surface **400*a* of the duplex conveyance passage 400 on a line extended from an optical axis of the light emitted from the conveyance sensor 109 is inclined with respect to the optical axis of the light emitted from the conveyance sensor 109 that detects the presence of the sheet P conveyed in the conveyance passage 300. With such a configuration, the sheet P conveyed through the duplex conveyance passage 400 and the conveyance sensor 109 can be spaced apart from each other in the optical axis direction. Thus, the conveyance sensor 109 can be prevented from erroneously detecting the sheet P being conveyed through the duplex conveyance passage 400**.

In the present embodiment as described above, the sheet conveying device and the image forming apparatus according to the present disclosure are applied to a multifunction printer or multifunction peripheral (MFP) that has at least two of a photocopying function, a printing function, a scanning function, and a facsimile (FAX) function. However, no limitation is intended thereby, and the image forming apparatus according to the present disclosure may be applied to any image forming apparatus such as a printer, a copier, a scanner, and a facsimile.

The sheet conveying device of the present disclosure is applicable not only to the image forming apparatus but also to a sheet conveying device externally attached to the image forming apparatus (e.g., a large-capacity sheet feed bank).

The sheet-shaped object to be conveyed in the above-described embodiment may be, for example, coated paper, cardboard, a plastic film, prepreg, or copper foil.

Each function of the embodiments described above can be implemented by one or more processing circuits. The "processing circuit" in the present specification includes a processor programmed to execute each function by software like a processor implemented by an electronic circuit, and a device such as an application specific integrated circuit (ASIC), a digital signal processor (DSP), a field programmable gate array (FPGA), or a circuit module designed to execute each function described above.

Aspects of the present disclosure may be, for example, combinations of first to ninth aspects as follows.

First Aspect

A sheet conveying device includes a conveyor (e.g., the sheet conveyor 66), a curved conveyance passage (e.g., the conveyance passage 300), a conveyance sensor (e.g., the conveyance sensor 109), and a determination unit (e.g., the sheet-jam determination unit 611). The conveyor conveys a sheet object to be conveyed (e.g., the sheet P). The conveyance passage forms a passage of the sheet object conveyed by the conveyor. The conveyance sensor is disposed at a curved position of the conveyance passage and detects a presence of the sheet object. The determination unit determines clogging of the sheet object from an output result of the conveyance sensor. When a specific type of the sheet object is conveyed, the determination unit stops determination of clogging of the sheet object for a period of time from when the conveyance sensor detects passage of a leading end of the sheet object to when a trailing end of the sheet object passes the conveyance sensor.

Second Aspect

In the sheet conveying device according to the first aspect, a suspension period of the determination of clogging of the sheet object (e.g., the sheet P) is a period of time designed in advance according to a length of the sheet object in a conveyance direction and a conveyance speed of the sheet object.

Third Aspect

In the sheet conveying device according to the first or second aspect, the determination unit (e.g., the sheet-jam determination unit 611) resumes the determination of clogging of the sheet object (e.g., the sheet P) after the trailing end of the sheet object passes the conveyance sensor (e.g., the conveyance sensor 109).

Fourth Aspect

The sheet conveying device according to any one of the first to third aspects further includes a controller (e.g., the controller 61) that causes the conveyor (e.g., the sheet conveyor 66) to rotate in a direction in which the sheet object (e.g., the sheet P) is conveyed downstream in a conveyance direction before conveyance of the sheet object is started.

Fifth Aspect

In the sheet conveying device according to any one of the first to fourth aspects, a guide surface of the conveyance passage (e.g., the conveyance passage 300) on a line extending from an optical axis of light emitted from the conveyance sensor (e.g., the conveyance sensor 109) is inclined with respect to the optical axis of the light emitted from the conveyance sensor.

Sixth Aspect

In the sheet conveying device according to any one of the first to fifth aspects, a degree of curvature or an inclination angle of the conveyance passage (e.g., the conveyance passage 300) on a downstream side from a position corresponding to the conveyance sensor (e.g., the conveyance sensor 109) in a conveyance direction is greater than a degree of curvature or an inclination angle of the conveyance passage on an upstream side from the position corresponding to the conveyance sensor in the conveyance direction.

Seventh Aspect

The sheet conveying device according to any one of the first to sixth aspects further includes a fixing device (e.g., the fixing roller 108) that heats the sheet object (e.g., the sheet P), conveys the sheet object downstream in a conveyance direction, and is disposed in the conveyance passage (e.g., the conveyance passage 300). The conveyance sensor (e.g., the conveyance sensor 109) is disposed downstream from the fixing device in the conveyance direction and detects clogging of the sheet object occurring in the fixing device.

Eighth Aspect

The sheet conveying device according to any one of the first to seventh aspects further includes a duplex conveyance passage (e.g., the duplex conveyance passage 400) at a position facing the conveyance passage (e.g., the conveyance passage 300) in a direction orthogonal to a surface of the sheet object (e.g., the sheet P) conveyed along the conveyance passage. A guide surface (e.g., the guide surface 400*a*) of the duplex conveyance passage on a line extending from an optical axis of light emitted from the conveyance sensor (e.g., the conveyance sensor 109) is inclined with respect to the optical axis of the light emitted from the conveyance sensor.

Ninth Aspect

An image forming apparatus includes the sheet conveying device according to any one of the first to eighth aspects and an image forming device (e.g., the image forming device 65) that forms an image on the sheet object (e.g., the sheet P).

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A sheet conveying device comprising:

a conveyor to convey a sheet;

a curved conveyance passage along which the sheet is conveyed by the conveyor;

a conveyance sensor to detect a presence of the sheet, the conveyance sensor disposed at a curved position of the conveyance passage; and processing circuitry configured to determine clogging of the sheet from an output result of the conveyance sensor, wherein, when a specific type of the sheet is conveyed, the processing circuitry stops determination of clogging of the sheet for a period of time from when the conveyance sensor detects passage of a leading end of the sheet to when a trailing end of the sheet passes the conveyance sensor.

2. The sheet conveying device according to claim 1, wherein a suspension period of the determination of clogging of the sheet is a period of time designed in advance according to a length of the sheet in a conveyance direction and a conveyance speed of the sheet.

3. The sheet conveying device according to claim 1, wherein the processing circuitry resumes the determination of clogging of the sheet after the trailing end of the sheet passes the conveyance sensor.

4. The sheet conveying device according to claim 1, wherein the processing circuitry causes the conveyor to rotate in a direction in which the sheet is conveyed downstream in a conveyance direction before conveyance of the sheet is started.

5. The sheet conveying device according to claim 1, wherein a guide surface of the conveyance passage on a line extending from an optical axis of light emitted from the conveyance sensor is inclined with respect to the optical axis of the light emitted from the conveyance sensor.

6. The sheet conveying device according to claim 1, wherein a degree of curvature or an inclination angle of the conveyance passage on a downstream side from a position corresponding to the conveyance sensor in a conveyance direction is greater than a degree of curvature or an inclination angle of the conveyance passage on an upstream side from the position corresponding to the conveyance sensor in the conveyance direction.

7. The sheet conveying device according to claim 1, further comprising a fixing device to heat the sheet and convey the sheet downstream in a conveyance direction, the fixing device disposed on the conveyance passage, wherein the conveyance sensor is disposed downstream from the fixing device in the conveyance direction and detects clogging of the sheet occurring in the fixing device.

8. The sheet conveying device according to claim 1, further comprising a duplex conveyance passage at a position facing the conveyance passage in a direction orthogonal to a surface of the sheet conveyed along the conveyance passage, wherein a guide surface of the duplex conveyance passage on a line extending from an optical axis of light emitted from the conveyance sensor is inclined with respect to the optical axis of the light emitted from the conveyance sensor.

9. An image forming apparatus comprising:

the sheet conveying device according to claim 1; and an image forming device to form an image on the sheet.

* * * * *